United States Patent [19]

Copperthwaite et al.

[11] 4,400,474
[45] Aug. 23, 1983

[54] BASIC REFRACTORY CEMENTITIOUS MATERIAL AND COMPONENTS THEREOF

[75] Inventors: Martin Copperthwaite, Westfield; Michael A. Roberts, Totley, both of England

[73] Assignee: USS Engineers & Consultants, Inc., Pittsburgh, Pa.

[21] Appl. No.: 371,864

[22] Filed: Apr. 26, 1982

[51] Int. Cl.³ .............................................. C04B 35/04
[52] U.S. Cl. ................................... 501/119; 501/124; 106/104
[58] Field of Search ................. 501/119, 124; 106/104

[56] References Cited

U.S. PATENT DOCUMENTS 4,244,745 1/1981 Havranek et al. ................... 501/124

FOREIGN PATENT DOCUMENTS

| 15638 | 9/1980 | European Pat. Off. | 501/111 |
| 430036 | 6/1935 | United Kingdom | 501/124 |
| 765482 | 1/1957 | United Kingdom | 501/124 |
| 1368635 | 10/1974 | United Kingdom | 501/101 |
| 1383232 | 1/1975 | United Kingdom | 501/108 |
| 1439253 | 6/1976 | United Kingdom | 501/111 |
| 1503278 | 3/1978 | United Kingdom | 501/111 |
| 1534784 | 12/1978 | United Kingdom | 501/124 |

Primary Examiner—James Poer
Attorney, Agent, or Firm—William F. Riesmeyer, III

[57] ABSTRACT

A cementitious formulation which is self-setting when mixed with water, and which can be cast into monolithic refractory components capable of resisting molten metal and repeated thermal shocks, has three main components: high purity magnesia (at least 94% by weight being MgO); high purity alumina (at least 98% by weight $Al_2O_3$) and high alumina cement (preferably 75% $Al_2O_3$) by weight, or greater). The magnesia may be 60 to 95% by weight of the three components and the alumina amounts to at least 1% by weight of the three components. Castings produced from the formulation can survive repeated flame testing even after exposure to firing at elevated temperature: known, conventionally pressed and similarly fired magnesia refractories may not survive a single flame test.

29 Claims, No Drawings

BASIC REFRACTORY CEMENTITIOUS MATERIAL AND COMPONENTS THEREOF

BACKGROUND OF THE INVENTION

The present invention relates to basic refractory cementitious material and components thereof.

The invention moreover relates to a method of making such cementitious components as are exposed to chemical attack, wear and erosion by molten metals such as steel.

Refractory components of valves, and refractory nozzles for various purposes in the metal pouring art, having conventionally been produced by pressing and firing at high temperatures. Costly, high purity materials such as zirconia and 85 to 95% $Al_2O_3$-based refractories have been considered necessary in view of the extremely harsh service conditions to which the components are subjected. Energy expended in producing components by pressing and firing is substantial, since firing temperatures normally exceeding 1500° C. must be created and maintained throughout the firing process. The energy expenditure contributes significantly to the unit costs of components made from such fired refractory materials.

Despite the use of strong fired refractories in the metal pouring art, items such as valve plates commonly need frequent replacement at great cost.

Early prejudices against the use of refractory concretes—revolving around the belief that they could not possibly withstand harsh working conditions—are being overcome and concrete systems are being considered for the manufacture of metal pouring refractory components.

Recently, chemically-bonded concretes have been proposed, for instance for sliding gate valve plates. Like fired refractory plates, chemically bonded concrete plates are unlikely to withstand repeated thermal shocks. Thus, their use in valves for ingot teeming is expected to be beset by inconvenient stoppages for their replacement.

We have found certain hydraulically-bonded basic cementitious materials surprisingly possess the ability to withstand thermal shock extremely well, and the production of components from these materials is particularly straightforward. Our proposed materials are composed of magnesia and an hydraulic aluminous cement, and in addition free alumina, the latter being thought to contribute significantly to stabilizing and strengthening components made from our materials.

SUMMARY OF THE INVENTION

According to the present invention, there is provided an hydraulic refractory cementitious formulation for making cast refractory parts resistant to molten metals, the formulation comprising an admixture including three components, namely fused or sintered magnesia, alumina and hydraulic aluminous cement, the magnesia component being present in an amount of 60 to 95%, the alumina component being present in an amount of at least 1% and the cement component being present in an amount of 4 to 15%, the percentages being by weight of the total weight of the three components, and the formulation after wetting being capable of hydraulically setting at room temperature.

The invention also provides cast refractory shapes moulded from the above formulation and caused to self set.

Accordingly, the invention for instance provides a cast refractory shape produced from the formulation defined hereinabove, which has a cold crushing strength after subjection to temperatures of 110°, 1000° C. and 1500° C. of 492, 517 and 868 kp/cm² respectively and a bulk density after subjection to these temperatures of 2.83. 2.78 and 2.85 g/cc.

The invention further provides a method of making a refractory part which is exposed to wear or erosion by molten metal, which comprises vibration casting the part in a mould from hydraulic concrete prepared by adding water to the formulation as defined hereinabove, curing or setting the casting and allowing it to dry.

Manufacture of refractory shapes from the present formulations could involve firing to say 1500° C. before they are placed in service. Such pre-firing will usually be unnecessary, however, as firing will occur in service.

DESCRIPTION OF THE PREFERRED EMBODIMENT

Formulations according to the invention essentially comprise three components, namely magnesia, alumina per se and aluminous hydraulic hydraulic cement. Optionally, minor amounts of other components can be added for specific purposes, e.g., plasticizing compounds, wetting agents and C-containing materials such as tar or pitch. The latter is commonly used in valve plates and nozzles to prevent slags adhering to such components.

In formulations according to the invention, it appears that the first two components should be of high purity for best results.

Thus, the magnesia component should have an MgO content of at least 94% by weight of the magnesia component, and the alumina component should have an $Al_2O_3$ content of at least 98% by weight of the alumina component. The alumina can be sintered, fused or preferably calcined.

The cement component could in principle be any high-alumina cement ($Al_2O_3$ content greater than 45% by weight of the cement).

Preferably, however, the aluminous cement component has an $Al_2O_3$ content of not less than 75% by weight of the cement component.

The magnesia component is a major part of the formulation by weight, and the alumina component must be present in an amount at least 1% by weight of the total weight of the three components.

The magnesia component may be present in an amount in the range 60 to 95% by weight of the total weight of the three components. On the same percentage basis, the alumina component is in the range 1 to 36% and the cement component is in the range 4 to 15%.

The said percentage basis will be used for all percentage figures hereinafter unless stated to the contrary.

Preferred formulations according to the invention have the three components within the following ranges: magnesia 70 to 86%, alumina 5 to 15% and cement 9 to 15%.

As is known in the art, the formulation should be prepared from graded particulate materials. The cement component, for instance, should have a particle size of 75 microns or less. It is tolerable for some cement particles to be larger, but preferably at least 90% of the cement (by weight of the total cement) has a particle size of 75 microns or less.

Regarding the magnesia component, 20 to 40% e.g., 20 to 30% (of the total weight of the three components) is desirably magnesia having particle sizes within the range −5 mm to +1 mm, preferably −3 mm to +1 mm. Similarly, 15 to 35% e.g., 20 to 30% is magnesia having particle sizes within the range −1 mm to +0.3 mm and 25 to 40% e.g., 30 to 40% is magnesia having particle sizes less than or equal to 0.3 mm.

Regarding the alumina component, 1 to 20% e.g., 5 to 10% of the total weight of the three components is preferably alumina having a particle size equal to or less than 45 microns. Up to 20% e.g., 0 to 5% of the total weight of the three components can be alumina having a particle size of 0.3 mm or less.

The magnesia component can be Steetley Britmag 31 PHD, the alumina component can be Alcoa calcined alumina A17 and the cement component can be Alcoa CA-25.

Formulations according to the invention can be selected from the data given in the following tabulation:

| MATERIAL | SIZE RANGE | | PERCENTAGE RANGE | |
|---|---|---|---|---|
| | Overall | Preferred | Overall | Preferred |
| Magnesia (Sintered or Fused) | −5 mm + 1 mm | −3 mm + 1 mm | 20–40 | 20–30 |
| Magnesia (Sintered or Fused) | −1 mm + 0.3 mm | −1 mm + 0.3 mm | 15–35 | 20–30 |
| Magnesia (Sintered or Fused) | <0.3 mm | <0.3 mm | 25–40 | 30–40 |
| Alumina (sintered, fused or calcined) | <0.3 mm | <0.3 mm | 0–20 | 0–5 |
| Alumina (calcined, fused or sintered but preferably calcined) | <45 microns | <45 microns | 1–20 | 5–10 |
| Hydraulic cement with $Al_2O_3$ content greater than 75% | Min 90% <75 microns | Min 90% <75 microns | 4–15 | 9–12 |

The present formulations are mixed with water in an amount adequate to yield a workable mix. Such a mix may, for instance, contain 7% water by weight of the mix.

Formulations according to the invention are self-setting at room temperature. Application of heat is unnecessary, although moderate heating to accelerate curing of cast shapes may be permissible.

Without heating, however, curing to a state allowing de-moulding can be achieved within one hour or so. Thus high productivity can be achieved.

The present hydraulically-bonding formulations possess significant advantages over chemically-bonded systems. A problem ever present with chemically-bonded systems is that when they are in the process of heat setting and drying, the binder tends to migrate to exposed surfaces. Bond migration and resulting non-uniformity of the integrity of castings do not arise with the present formulations. Moreover, a rigid set occurs with the present formulations so that handling of castings, e.g., when de-moulding, it free from the risk of introducing internal stress flaws. It is not impossible with chemically-bound castings to adversely affect them during handling.

The present formulations have surprisingly excellent resistance to thermal shock. They are therefore expected to find use in parts of sliding gate valves and associated pouring nozzles used in the intermittent teeming of molten metals, e.g., steel, during ingot casting, for instance.

A commonly used test for thermal shock resistance is the torch test developed by U.S. Steel Corporation's Research Laboratories. In this test, an oxy-propane torch flame is slowly traversed over a refractory being tested at 1.7 mm per second, the torch being held 6.4 mm from the refractory surface.

Conventional pressed and fired magnesia valve plates cannot ordinarily withstand just one pass of the oxy-propane flame without significant surface and internal damage. Known chemically-bonded magnesia valve plates are better able to resist the flame, but our tests have revealed moderate degradation following one pass.

By contrast, valve plates made from our present formulations have been found capable of withstanding repeated passes, numbering twelve, without significant surface degradation. This implies their ability to cope with the temperature variations encountered during repeated valve throttling and open/shut valve operations will show a marked improvement over fired or chemically bonded plates.

As indicated above, the present formulations can be used for casting valve plates for sliding gate valves as well as nozzles such as collectors and extended pouring tubes associated therewith. Ladle wells and dispensing nozzles can also be produced from the formulations and other applications will be apparent to the addressee.

Articles cast from the present formulations will ordinarily be supplied to the metallurgical industry in the hydraulically set state. Nevertheless, it may sometimes be desired to supply the cast articles in a pre-fired condition, rather than allow them to fire in service. Pre-firing may be applicable for example to articles such as replaceable wear and erosion resistant sleeves or liners for discharge nozzles.

A specific example of the invention is now given:

EXAMPLE

This formulation comprised a dry admixture of the Steetley and Alcoa materials noted above, in the following proportions. The percentages given are again by weight of the total weight of the magnesia, alumina and cement components.

| | |
|---|---|
| Magnesia, size range −3 to +1 mm | 26% |
| Magnesia, size range −1 to +0.3 mm | 25% |
| Magnesia, size less than or equal to 0.3 mm | 34% |
| Calcined alumina, size less than or equal | |

|  |  |
|---|---|
| to 75 microns | 6% |
| High alumina cement | 9% |

The cement had an $Al_2O_3$ content greater than 75% by weight of the cement, and at least 90% by weight of the cement had a particle size less than 75 microns. The magnesia and alumina respectively had MgO and $Al_2O_3$ contents of 94 and 98% by weight of these components.

The formulation yielded a workable and adequately fluent concrete for casting when mixed with water amounting to 7% of its weight of these components.

The formulation yielded a workable and adequately fluent concrete for casting when mixed with water amounting to 7% of its weight. Mould filling can be asisted by vibration, an exemplary vibration frequency being 3000 Hz.

Vibration cast concrete samples prepared as above, after curing and drying, possessed the following properties at the stated temperatures:

| PROPERTY | FIRING TEMPERATURE °C. | | | |
|---|---|---|---|---|
|  | 110 | 1000 | 1500 | 1700 |
| Bulk Density g/cc | 2.83 | 2.78 | 2.85 |  |
| Apparent Porosity % | 16.0 | 19.3 | 17.0 |  |
| Permanent Linear change Dry to Fired % |  | +0.01 | −1.24 | −3.44 |
| Cold Crushing Strength p.s.i. | 7000 | 7350 | 12350 |  |
| MNM$^{-2}$ | 48.3 | 50.8 | 85.2 |  |
| Kp.cm$^{-2}$ | 492 | 517 | 868 |  |
| Flame Test 1 Cycle | Pass |  |  | Pass |
| Flame Test 12 Cycles | Pass |  |  | Pass |

The foregoing properties are considered entirely suitable for making monolithic (i.e., cast) sliding gate valve components which, if desired, can be supplied in a subsequently fired condition.

The effect of the alumina component in the present formulations is not fully understood. Without wishing to be bound by theory, we suspect the alumina component may play a dual role. Firstly, it may react with the magnesia component to form magnesium aluminate spinel. At any rate, the alumina appears to minimise shrinking upon firing. By contrast, magnesia-calcium aluminate cements suffer significant shrinkage, unless alumina is specifically added. Secondly, high melting point inter-phases of magnesia, alumina and lime may be formed and contribute to the advantageous refractory properties attained by the present formulations.

In summary, the present formulations possess extremely favourable refractory properties coupled with excellent thermal shock resistance. These properties commend the formulations to applications such as the flow-controlling refractories used in interrupted metal teeming operations. Manufacture of such refractories is by the advantageously simple routine of casting monolithically, followed by air setting. The use of hydraulic presses is unnecessary and firing the set castings to high temperature is only optional.

We claim:

1. An hydraulic refractory cementitious formulation consisting essentially of:
   70 to 86% of a magnesia component containing at least 94% MgO,
   5 to 15% of an alumina component containing at least 98% $Al_2O_3$,
   9 to 15% of an aluminous cement component containing at least 45% $Al_2O_3$,
   said formulation after wetting being capable of hydraulically setting at room temperature.

2. A formulation according to claim 1 wherein said cement component contains at least 75% $Al_2O_3$.

3. A formulation according to claim 1 wherein said alumina component is selected from the group consisting of sintered alumina, fused alumina, calcined alumina, and mixtures thereof.

4. A formulation according to claim 1 wherein said alumina component is present in the amount of 5 to 10%, and said alumina component has a particle size of 45 microns or less.

5. A formulation according to claim 1 wherein said cement component is present in an amount of 9 to 12%.

6. A formulation according to claim 1 or 5 wherein said cement component has a particle size of 75 microns or less.

7. The formulation of claim 1 wherein 20 to 40% of the formulation is said magnesia component having particle sizes within the range −5 mm to +1 mm, 15 to 35% on the same basis is said magnesia component having particle sizes in the range −1 mm to +0.3 mm, and 25 to 40% on the same basis is said magnesia component having particle sizes of 0.3 mm or less.

8. The formulation of claim 1 wherein 0 to 20% of the formulation is said alumina component having particle sizes of 0.3 mm or less and 1 to 20% on the same basis is said alumina component having particle sizes of 45 microns or less.

9. The formulation of claim 1 wherein 20 to 30% of the formulation is said magnesia component having particle sizes within the range −3 mm to +1 mm, 20 to 30% on the same basis is said magnesia component having particle sizes within the range −1 mm to +0.3 mm, 30 to 40% on the same basis is said magnesia component having particle sizes less than or equal to 0.3 mm, 5 to 10% on the same basis is said alumina component in the form of calcined alumina and having particle sizes not less than 45 microns, and 9 to 12% on the same basis is said cement component 90% of which has particle sizes not less than 75 microns.

10. A cast refractory shape produced from an hydraulic refractory cementitious formulation consisting essentially of:
    70 to 86% of a magnesia component containing at least 94% MgO,
    5 to 15% of an alumina component containing at least 98% $Al_2O_3$,
    9 to 15 % of an aluminous cement component containing at least 45% $Al_2O_3$,
    said formulation after wetting being capable of hydraulically setting at room temperature,
    said cast refractory shape having a cold crushing strength after subjection to temperatures of 110°, 1000° and 1500° C. of about 492, 517 and 868 kp/cm$^2$ respectively and a bulk density after subjection to these temperatures of about 2.83, 2.78 and 2.85 g/cc.

11. The cast refractory shape of claim 1 wherein said shape has a linear dimensional stability characterised by an increase of 0.01% after subjection to a temperature of 1000° C. and by a decrease of 1.24% after subjection to a temperature of 1500° C.

12. The cast refractory shape of claim 10 wherein the cement component of said formulation contains at least 75% $Al_2O_3$.

13. The cast refractory shape of claim 10 wherein the alumina component of said formulation is selected from the group consisting of sintered alumina, fused alumina, calcined alumina, and mixtures thereof.

14. The cast refractory shape of claim 10 wherein the alumina component of said formulation is present in the amount of 5 to 10%, and said alumina component has a particle size of 45 microns or less.

15. The cast refractory shape of claim 10 wherein the cement component of said formulation is present in an amount of 9 to 12%.

16. The cast refractory shape of claim 10 wherein the cement component of said formulation has a particle size of 75 microns or less.

17. The cast refractory shape of claim 10 wherein 20 to 40% of the formulation is said magnesia component having particle sizes within the range −5 mm to +1 mm, 15 to 35% on the same basis is said magnesia component having particle sizes in the range −1 mm to +0.3 mm, and 25 to 40% on the same basis is said magnesia component having particle sizes of 0.3 mm to less.

18. The cast refractory shape of claim 10 wherein 0 to 20% of the formulation is said alumina component having particle sizes of 0.3 mm or less and 1 to 20% on the same basis is said alumina component having particle sizes of 45 microns or less.

19. The cast refractory shape of claim 10 wherein 20 to 30% of the formulation is said magnesia component having particle sizes within the range −3 mm to +1 mm, 20 to 30% on the same basis is said magnesia component having particle sizes within the range −1 mm to +0.3 mm, 30 to 40% on the same basis is said magnesia component having particle sizes less than or equal to 0.3 mm, 5 to 10% on the same basis is said alumina component in the form of calcined alumina and having particle sizes not less than 45 microns, and 9 to 12% on the same basis is said cement component 90% of which has particle sizes not less than 75 microns.

20. A method of making a refractory part, comprising:
preparing a hydraulic refractory cementitious formulation consisting essentially of
70 to 86% of a magnesia component containing at least 94% MgO,
5 to 15% of an alumina component containing at least 98% $Al_2O_3$,
9 to 15% of an aluminous cement component containing at least 45% $Al_2O_3$,
said formulation after wetting being capable of hydraulically setting at room temperature,
adding water to the formulation so as to obtain a hydraulic concrete,
forming the part in a mold by vibration casting said hydraulic concrete therein,
and curing the casting and allowing it to dry.

21. The method of claim 20 wherein the amount of water added in said step to obtain a hydraulic concrete is about 7% by weight of the weight of said formulation, and wherein said curing steps takes place at room temperature.

22. The method of claim 20 wherein the cement component in said formulation contains at least 75% $Al_2O_3$.

23. The method of claim 20 wherein the alumina component in said formulation is selected from the group consisting of sintered alumina, fused alumina, calcined alumina, and mixtures thereof.

24. The method of claim 20 wherein the alumina component in said formulation is present in the amount of 5 to 10%, and said alumina component has a particle size of 45 microns or less.

25. The method of claim 20 wherein the cement component in said formulation is present in an amount of 9 to 12%.

26. The method of claim 20 wherein the cement component in said formulation has a particle size of 75 microns or less.

27. The method of claim 20 wherein 20 to 40% of the formulation is said magnesia component having particle sizes within the range −5 mm to +1 mm, 15 to 35% on the same basis is said magnesia component having particles sizes in the range −1 mm to +0.3 mm, and 25 to 40% on the same basis is said magnesia component having particle sizes of 0.3 mm or less.

28. The method of claim 20 wherein 0 to 20% of the formulation is said alumina component having particle sizes of 0.3 mm or less and 1 to 20% on the same basis is said alumina component having particle sizes of 45 microns or less.

29. The method of claim 20 wherein 20 to 30% of the formulation is said magnesia component having particle sizes within the range −3 mm to +1 mm, 20 to 30% on the same basis is said magnesia component having particle sizes within the range −1 mm to 0.3 mm, 30 to 40% on the same basis is said magnesia component having particle sizes less than or equal to 0.3 mm, 5 to 10% on the same basis is said alumina component in the form of calcined alumina and having particle sizes not less than 45 microns, and 9 to 12% on the same basis is said cement component 90% of which has particle sizes not less than 75 microns.

* * * * *